United States Patent
Rabii et al.

(10) Patent No.: US 9,723,610 B2
(45) Date of Patent: Aug. 1, 2017

(54) MULTI-LAYER TIMING SYNCHRONIZATION FRAMEWORK

(71) Applicant: QUALCOMM Incorporated, San Diego, CA (US)

(72) Inventors: Khosro Mohammad Rabii, San Diego, CA (US); Vijay Naicker Subramaniam, San Diego, CA (US); Alireza Raissinia, Monte Sereno, CA (US); Fawad Shaukat, San Diego, CA (US); Shivakumar Balasubramanyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 14/680,901

(22) Filed: Apr. 7, 2015

(65) Prior Publication Data
US 2016/0302193 A1 Oct. 13, 2016

(51) Int. Cl.
*H04W 72/04* (2009.01)
*H04N 21/4363* (2011.01)
(Continued)

(52) U.S. Cl.
CPC ....... *H04W 72/0446* (2013.01); *H04J 3/0664* (2013.01); *H04L 1/1877* (2013.01);
(Continued)

(58) Field of Classification Search
CPC .................................. H04W 72/0446
See application file for complete search history.

(56) References Cited

U.S. PATENT DOCUMENTS

| 6,145,098 A | * | 11/2000 | Nouri | ........................ | G06F 1/20 |
| | | | | | 714/31 |
| 6,278,710 B1 | * | 8/2001 | Eidson | ..................... | G06F 1/14 |
| | | | | | 370/394 |

(Continued)

FOREIGN PATENT DOCUMENTS

WO  2012100197 A1  7/2012

OTHER PUBLICATIONS

Arasan, "Data Sheet," Arasan Chip Systems Inc., Jul. 2013, Revision Number: 1.1, 10 pages.
(Continued)

*Primary Examiner* — Andrew Lai
*Assistant Examiner* — Andrew C Lee
(74) *Attorney, Agent, or Firm* — MG-IP Law, P.C.

(57) ABSTRACT

A device for transmitting data to a network includes a source subsystem and a communication subsystem. The source subsystem generates a first data packet that includes first timing information that is based on a time that the first data packet is generated. The first timing information is generated responsive to a first timing generator included in the source subsystem. The communication subsystem is coupled to the source subsystem via one or more abstraction layers and is configured to modify the first data packet to generate a modified data packet for transmission to the network. The modified data packet includes the first timing information and second timing information that is based on a time that the modified data packed is transmitted. The communications subsystem includes a second timing generator that is linked to the first timing generator through the one or more abstraction layers to generate the second timing information.

30 Claims, 9 Drawing Sheets

(51) Int. Cl.
    H04J 3/06      (2006.01)
    H04W 4/18      (2009.01)
    H04W 56/00     (2009.01)
    H04W 72/08     (2009.01)
    H04L 1/18      (2006.01)

(52) U.S. Cl.
    CPC ........ *H04N 21/43637* (2013.01); *H04W 4/18* (2013.01); *H04W 56/0045* (2013.01); *H04W 72/082* (2013.01)

(56) References Cited

U.S. PATENT DOCUMENTS

| | | | |
|---|---|---|---|
| 7,181,485 B1* | 2/2007 | Lau | G06F 1/14 709/203 |
| 7,483,450 B1 | 1/2009 | Giese et al. | |
| 8,707,077 B2 | 4/2014 | Knowles | |
| 2004/0008661 A1* | 1/2004 | Myles | H04J 3/0664 370/350 |
| 2005/0036512 A1 | 2/2005 | Loukianov | |
| 2005/0152330 A1* | 7/2005 | Stephens | H04B 7/269 370/350 |
| 2008/0075126 A1 | 3/2008 | Yang | |
| 2008/0273521 A1* | 11/2008 | Shao | H04W 56/0015 370/350 |
| 2009/0052431 A1* | 2/2009 | Kroener | H04J 3/0664 370/350 |
| 2010/0191995 A1 | 7/2010 | Levy et al. | |
| 2011/0023078 A1 | 1/2011 | Takatori et al. | |
| 2011/0216747 A1* | 9/2011 | Shao | H04W 56/0065 370/338 |
| 2011/0292820 A1* | 12/2011 | Ekbal | G01S 13/765 370/252 |
| 2012/0297306 A1* | 11/2012 | Hassan | H04W 76/023 715/735 |
| 2013/0019038 A1 | 1/2013 | Gruber et al. | |
| 2013/0195233 A1* | 8/2013 | Amichai | H04L 7/0012 375/354 |
| 2013/0198292 A1* | 8/2013 | Aaltonen | H04W 56/00 709/205 |
| 2013/0232253 A1* | 9/2013 | Elhaddad | H04W 8/005 709/224 |
| 2014/0044118 A1* | 2/2014 | Kim | H04W 56/0075 370/338 |
| 2014/0344490 A1* | 11/2014 | Tsfaty | G06F 13/4286 710/106 |
| 2015/0063375 A1* | 3/2015 | Tzeng | H04J 3/0673 370/512 |
| 2015/0103818 A1* | 4/2015 | Kuhn | H04W 56/00 370/350 |
| 2015/0220140 A1* | 8/2015 | Por | G06F 13/4221 710/314 |
| 2016/0182176 A1* | 6/2016 | Ramachandra | H04J 3/0661 370/429 |

OTHER PUBLICATIONS

Harada S., et al., "Development of Audio and Video Synchronous Transmission System Based on IEEE802.11a", consumer Communications and Networking Conference, 2004. CCNC 2004. First IEEE Las Vegas, NV, USA Jan. 5-8, 2004, Piscataway, NJ, USA, IEEE, Jan. 5, 2004 (Jan. 5, 2004), pp. 316-319, XP032165228, DOI: 10.1109/CCNC.2004.1286879 ISBN: 978-0/7803-8145-2 p. 317, left-hand column, paragraph 1-p. 318, left-hand column, paragraph 2 figures 2-4, 6a.

International Search Report and Written Opinion—PCT/US2016/021229—ISA/EPO—Jun. 3, 2016.

Kannisto J., et al., "Software and Hardware Prototypes of the IEEE 1588 Precision Time Protocol on Wireless LAN", Local and Metropolitan Area Networks, 2005. LANMAN 2005. The 14th IEEE Workshop on Chania, Crete, Greece Sep. 18-21, 2005, Piscataway, NJ, USA, IEEE, Sep. 18, 2005 (Sep. 18, 2005), pp. 1-6, XP010854276, DOI: 10.1109/LANMAN.2005.1541513 ISBN: 978-0/7803-9565-7 figures 1,3,4,7 p. 4, right-hand column, paragraph 1.

Halperin D., et al., "Demystifying 802.11n Power Consumption," HotPower, 2010, pp. 1-5.

Stanton K., "AV Time Synchronization for Wired and Wireless 802 LANs," IEEE 802.1 Time Synchronization for Wireless, Jun. 13, 2006, pp. 1-20.

Stanton K.B., et al., "Tutorial: The Time-Synchronization Standard from the AVB/TSN suite," IEEE Standard 802.1AS(TM)-2011, Jul. 2014, pp. 1-45.

* cited by examiner

MULTI-LAYER TIMING SYNCHRONIZATION FRAMEWORK

FIELD OF DISCLOSURE

This disclosure relates generally to transmitting data packets in a network and, in particular but not exclusively, relates to the delivery of timing information in a multimedia platform.

BACKGROUND

Recent advances have been made to allow direct streaming of video and audio directly from one wireless communication enabled device to another. One such system is known as "Miracast." Miracast is a trademark for a wireless (e.g. IEEE 802.11 family of wireless protocols or "Wi-Fi") display protocol promulgated by the Wi-Fi Alliance. As used herein, the term Miracast refers to the current form of the Wi-Fi Alliance's display sharing protocol, also known as Wi-Fi Display (WED). The Miracast specification is designed for streaming any type of video bitstream from a source device to a sink (e.g., client) device. As one example, a source may be a smart phone, and a sink may be a television set. Several peer-to-peer wireless technologies have been developed for securely and wirelessly sending video and audio from a source device to a remote display device. Examples of such technologies include WiDi developed by Intel Corporation, and AirPlay developed by Apple Inc. In an effort to provide an open standard, the Wi-Fi Alliance (WFA) has developed the Miracast standard, which uses Wi-Fi Direct interconnect supported devices without the need for a wireless access point (AP). A Wi-Fi Direct network is in contrast to typical IEEE 802.11 wireless networks, which do include client devices communicating through an AP device.

The Miracast system uses such direct device protocols for sending display data from one device to another, such as from a smart phone to a television or computer, or vice-versa. The Miracast system involves sharing the contents of a frame buffer and speaker audio of the source device to a remote client display/speaker device (sink) over a Wi-Fi connection.

The Miracast protocol involves the source capturing the RGB data from the frame buffer and any PCM (Pulse Coded Modulation) audio data from the audio subsystem. The content of the frame buffer may be derived from application programs or a media player running on the source. The source then compresses the video and audio content, and transmits the data to the sink device. On receiving the bitstream, the sink decodes and renders it on its local display and speakers. In order to maintain synchronization between the source and sink devices, the bitstream may include timing information, periodically transmitted to the sink device from the source device. Such timing information (e.g., a timestamp) may be used by the sink device to enable certain multimedia use-cases.

However, in Wi-Fi networks, collisions, noise and interference, signal-fade, and channel-adaptation often requires retransmission to resend not-acknowledged packets which may cause non-deterministic packet transfer latency, disorderly packets delivery, timing distortions (latency & jitter). These irregularities can skew timing synchronization between the source and sink devices, and/or disrupt isochronous renditions (Lipsync, Surround-Sound, Multichannel-Video, GFX/HTML Remote-Rendition, etc.).

SUMMARY

Exemplary embodiments of the invention are directed to a multi-layer timing synchronization framework for use in a device transmitting data in a network.

In one aspect, a device for transmitting data to a network includes a source subsystem and a communication subsystem. The source subsystem generates a first data packet that includes first timing information that is based on a time that the first data packet is generated. The first timing information is generated responsive to a first timing generator included in the source subsystem. The communication subsystem is coupled to the source subsystem via one or more abstraction layers and is configured to modify the first data packet to generate a modified data packet for transmission to the network. The modified data packet includes the first timing information and second timing information that is based on a time that the modified data packed is transmitted. The communications subsystem includes a second timing generator that is linked to the first timing generator through the one or more abstraction layers to generate the second timing information.

According to another aspect, a method for transmitting data in a network includes generating a first data packet at a first abstraction layer, where the first data packet includes first timing information that is based on a time at which the first data packet is generated in response to a first timing generator. The method also includes modifying the first data packet to generate a modified data packet at a second abstraction layer, where the modified data packet includes the first timing information and second timing information that is based on a time at which the modified data packet is transmitted to the network. The second timing information is generated in response to a second timing generator at the second the second abstraction layer and the second timing generator at the second abstraction layer is linked to the first timing generator at the first abstraction layer. The modified data packet is then transmitted to the network.

In yet another aspect, a device for transmitting data in a network includes means for generating a first data packet at a first abstraction layer, means for modifying the first data packet to generate a modified data packet at a second abstraction layer, and means for transmitting the modified data packet to the network. The first data packet includes first timing information that is based on a time at which the first data packet is generated in response to a first timing generator. The modified data packet includes the first timing information and second timing information that is based on a time at which the modified data packet is transmitted to the network. The second timing information is generated in response to a second timing generator at the second abstraction layer, and the second timing generator at the second abstraction layer is linked to the first timing generator at the first abstraction layer.

In still another aspect, a non-transitory computer-readable medium for transmitting data in a network includes at least one instruction to generate a first data packet at a first abstraction layer, where the first data packet includes first timing information that is based on a time at which the first data packet is generated in response to a first timing generator. The medium also includes at least one instruction to modify the first data packet to generate a modified data packet at a second abstraction layer. The modified data packet includes the first timing information and second timing information that is based on a time at which the modified data packet is transmitted to the network. The second timing information is generated in response to a second timing generator at the second abstraction layer, and the second timing generator at the second abstraction layer is linked to the first timing generator at the first abstraction layer. The medium further includes at least one instruction to transmit the modified data packet to the network.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
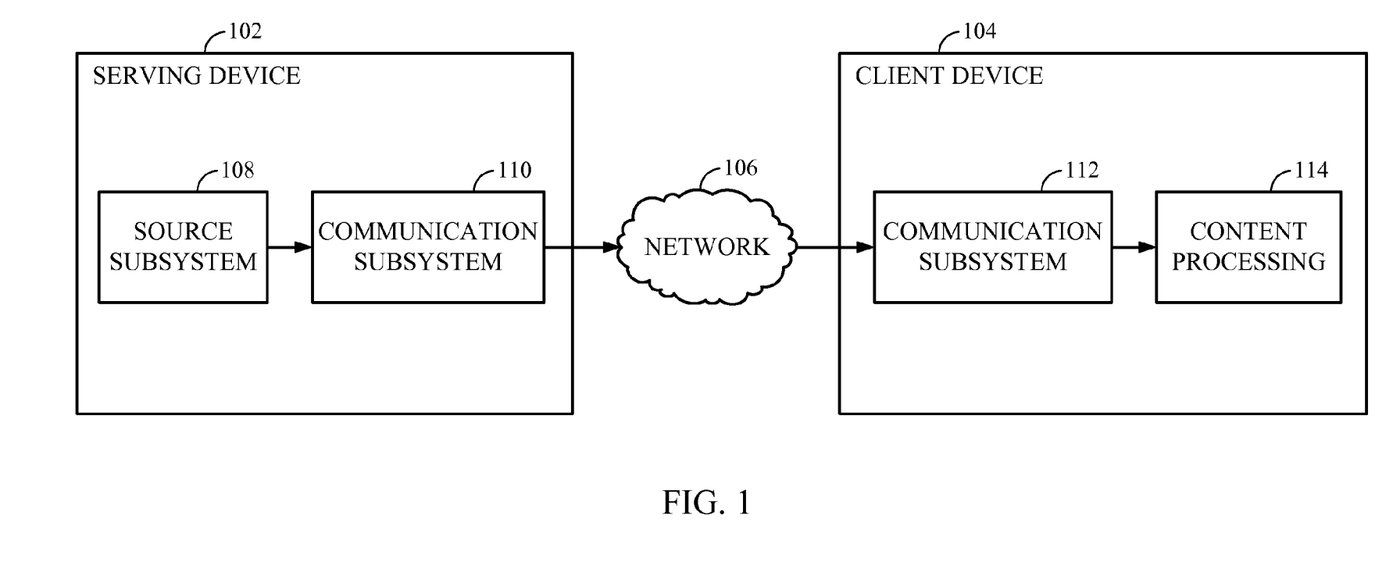
FIG. 1 is a functional block diagram illustrating a serving device communicating data to a client device via a network.

FIG. 1 is a functional block diagram illustrating a serving device 102 transmitting data to a client device 104 via a network 106. In the illustrated example of FIG. 1, serving device 102 includes a source subsystem 108 coupled to a communication subsystem 110, while client device 104 includes a communication subsystem 112 coupled to a content processing module 114.

In one example, network 106 is a wireless network including a Wi-Fi Direct connection, where both serving device 102 and client device 104 are Wi-Fi Direct interconnect supported devices. For example, communication subsystem 110 and communication subsystem 112 may include wireless subsystems capable of communicating via a Wi-Fi Direct network. Accordingly, serving device 102 includes a source subsystem 108 for generating one or more data packets, where communication subsystem 110 may wirelessly transmit the generated data packet on network 106 for transmission to client device 104. Similarly, communications subsystem 112 is configured to wirelessly receive data packets via the network 106. The data packets received by communications subsystem 112 are then provided to content processing module 114 for further processing (e.g., decoding, displaying, forwarding, etc.), depending on the application. For instance, in one embodiment, serving device 102 may be configured to stream multimedia data, such as video, audio, messages, and/or a combination thereof. Client device 104 may be configured to display the video data at a display and/or output audio data from speakers. Client device 104 may include or otherwise output the received multimedia data to a video display, speakers, and the like.

As mentioned above, some multimedia use-cases or applications require the synchronization of services between the serving device 102 and the client device 104. Thus, service device 102 may be configured to periodically transmit timing information, such as a timestamp, to the client device 104. Accordingly, source subsystem 108 may periodically generate data packets that include such timing information corresponding to a time at which the data packet is generated. In some systems, these data packets may be referred to as timing adaptation frames. Communication subsystem 110 then transmits data packets, including the timing information, to the client device 104. Client device 104 may then utilize the timing information to synchronize the playback of the multimedia data. In some protocols, such as in some wireless display standards, synchronization depends on MPEG/DVB timing adaptation, where source timestamps are expected to be regularly delivered to every client device with nearly equal latency. However, in Wi-Fi networks, collisions, noise and interference, signal-fade, and channel-adaptation often requires retransmission of these data packets. In conventional systems, the retransmission of data packets may result significant latency between the time the data packet is generated by source subsystem 108 and the time that the data packet is actually delivered to client device 104. This discrepancy between the generated timing information and the delay in delivery over network 106 can skew timing synchronization between the source and sink devices, and/or disrupt isochronous renditions.

For example, video compression techniques predict a video frame from previous frames to reduce temporal redundancy. Depending on differential-coding hierarchy, packet loss in anchor/reference slice can cause prolonged decoding artifacts that are often noticeable. Similarly, surround-sound audio enables isochronous rendition of related sounds from several diversely positioned speakers in the use-environment to create field-of-depth/live-quality realism and enhance listening experience. Hence, packet loss in any audio channel degrades platform psycho-acoustic presentation quality.

Accordingly, embodiments of the present disclosure provide a timing synchronization framework to account for the above-noted latency issues in communicating timing information in a network. In one aspect, communication subsystem 110 is configured to append second timing information to the data packet received from source subsystem 108. The second timing information (e.g., a timestamp) corresponds to a time that the data packet is actually transmitted to network 106. Thus, the transmitted packet may include the first timing information that corresponds to the time source subsystem 108 generated the packet, as well as second timing information corresponding to a transmission time. In another aspect, with each retransmission of a respective data packet, communication subsystem 110 may be configured to update the second timing information, such that it accurately represents the time of the most recent retransmission. Upon receipt of the data packet containing both the first and second timing information, client device 104 may compensate for timing distortions caused by network latency (e.g., due packet loss, and/or retransmission) using both the first and second timing information.

However, in some systems, packet generation and Wi-Fi transmission occur at different abstraction layers of the protocol stack and may even be performed at differing subsystems (i.e., processors) within the serving device 102. For example, source subsystem 108 may include an MPEG digital signal processor (DSP) for generating audio and/or video data packets at a higher abstraction layer (e.g., application layer), while communication subsystem 110 may include a Wi-Fi subsystem processor for wirelessly transmitting data packets at a lower abstraction layer (e.g., physical layer).

Figure 2:
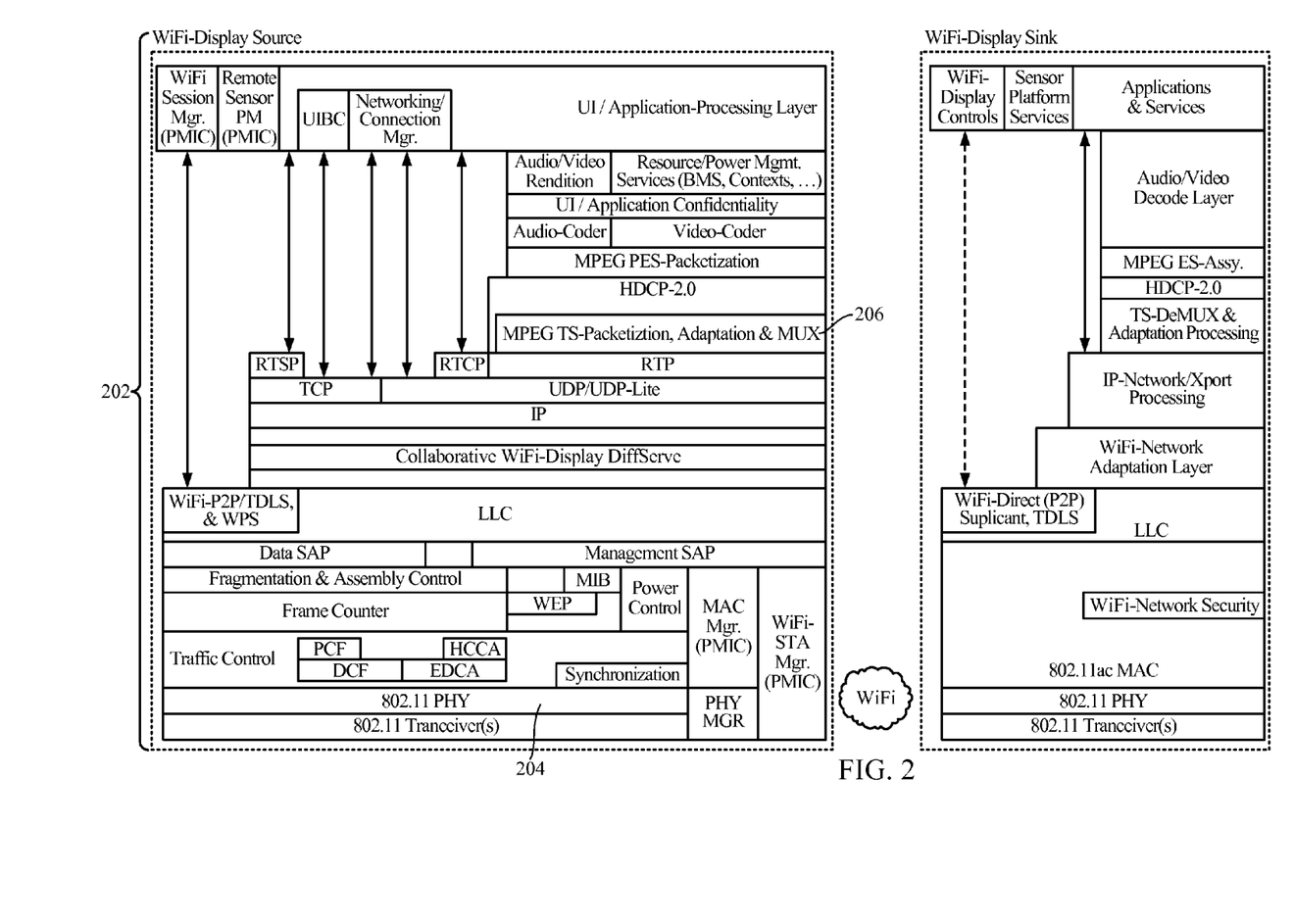
FIG. 2 is an example protocol stack for wirelessly communicating display information.

For example, FIG. 2 illustrates a protocol stack 202 for wirelessly communicating display information. Protocol stack 202 is one possible implementation of a protocol stack implemented by serving device 102 and client device 104, of FIG. 1, for communicating display information via a wireless network. As shown in FIG. 2 MPEG-TS packetization occurs at a higher abstraction layer 206 compared to the Wi-Fi communication by the lower 802.11 PHY abstraction layer 204.

Furthermore, referring back to FIG. 1, the source subsystem 108 may include a timing generator to generate timing information that is separate and distinct from the timing generator used by communication subsystem 110 to generate its timing information. Accordingly, embodiments of the present disclosure provide for mechanisms to link the timing generator of the source subsystem with the timing generator of the communication subsystem through one or more abstraction layers, such that the first and second timing information included in the timing data packets provide meaningful information to the client device regarding the difference between the time the data packet was generated and the time the data packet was transmitted (or retransmitted). In one embodiment, linking the first and second timing generators of the source subsystem 108 and the communication subsystem 110 refers to the coordination between the two timing generators such that the timing information generated by each at any instance in time is substantially the same. In another embodiment, linking the first and second timing generators refers to the second timing generator generating timing information with respect to a current value in the first timing generator communicated through the one or more abstraction layers. In yet another embodiment, linking the first and second timing generators refers to synchronizing the second timing generator with the second timing generator.

Figure 3:
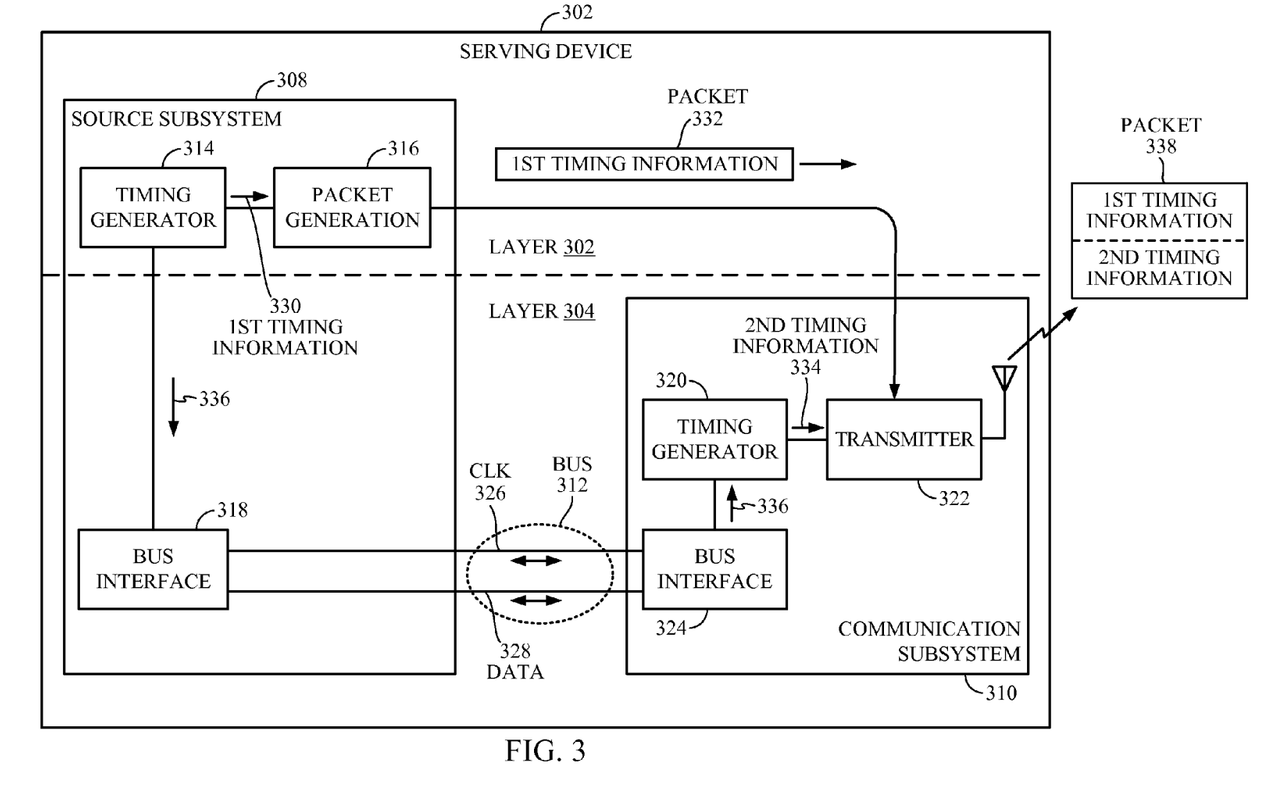
FIG. 3 is a functional block diagram illustrating a serving device having a source subsystem and a communication subsystem.

For example, FIG. 3 is a functional block diagram illustrating a serving device 302 having a source subsystem 308 and a communication subsystem 310, with linked timing generators 314 and 320. Serving device 302 is one possible implementation of serving device 102 of FIG. 1, where source subsystem 308 and communication subsystem 310 are possible implementations of source subsystem 108 and communication subsystem 110, respectively. The illustrated example of source subsystem 308 includes a timing generator 314, a packet generation component 316, and a bus interface 318. Communication subsystem 310 is shown as including timing generator 320, a transmitter 322, and a bus interface 324. Also shown in FIG. 3 is a bus 312 for connecting source subsystem 308 with communication subsystem 310 at layer 304. In one aspect, layer 304 is a lower abstraction layer (e.g., a physical layer) than that of illustrated layer 302, which may include an application layer. Although FIG. 3 illustrates layer 302 adjacent to layer 304, in some applications one or more abstraction layers may be interposed between layers 302 and 304.

In one embodiment, bus 312 is a synchronous interface coupled to both the source subsystem 308 and the communication subsystem 310 at a physical layer 304 and may be utilized for, among other things, linking timing generator 314 with timing generator 320. In one example, bus 312 is a Serial Low-power Inter-chip Media Bus (SLIMbus) for interfacing between baseband or application processors and peripheral components in serving device 302. In one aspect, bus 312 is implemented as a synchronous 2-wire, configurable Time Division Multiplexed (TDM) frame structure. Bus 312 may include supporting bus arbitration mechanisms and message structures which permit re-configuring the bus operational characteristics to system application needs at runtime. As shown in FIG. 3, the data line (DATA 328) and the clock line (CLK 326) interconnect source subsystem 308 and communication subsystem 310 in a multi-drop bus topology. In one embodiment, bus 312 includes no more than two communication lines (e.g., DATA 328 and CLK 326).

Figure 4:
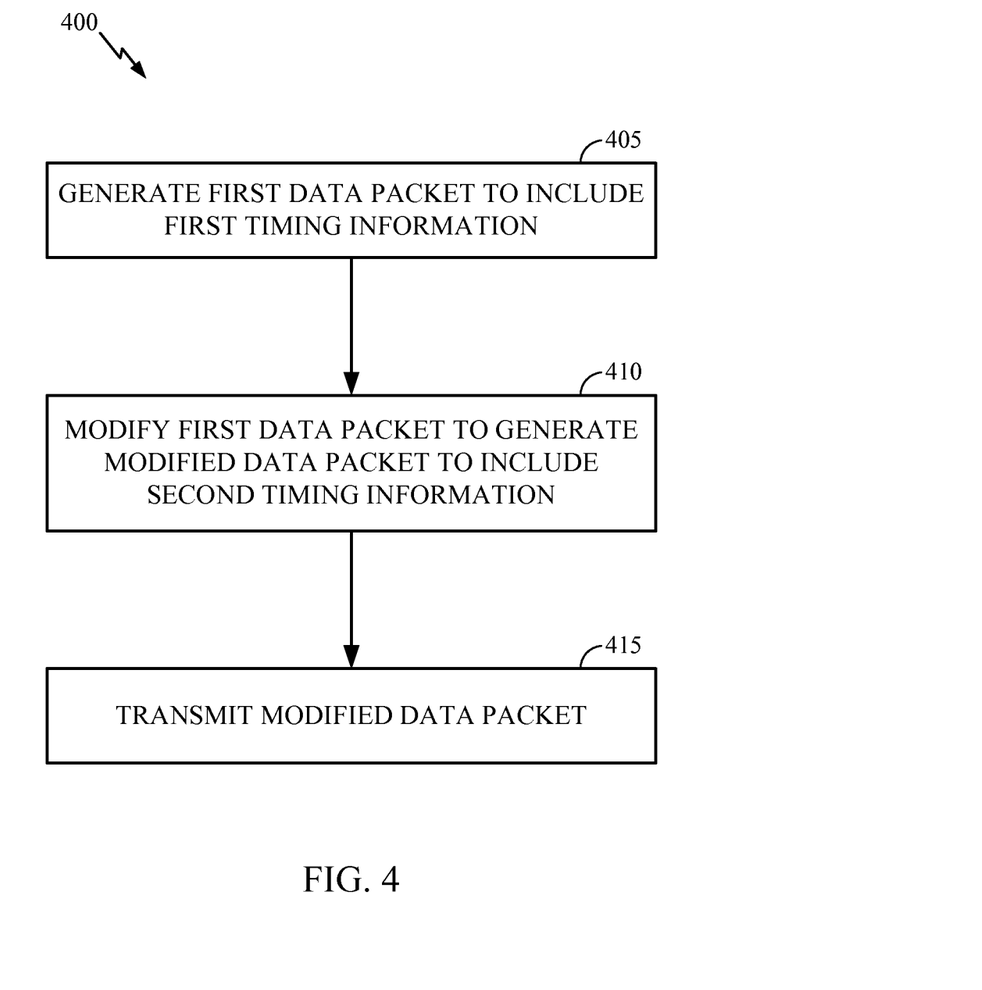
FIG. 4 is a flowchart illustrating a process of transmitting data in a network.

The operation of serving device 302 will now be described with reference to process 400 of FIG. 4. In particular, FIG. 4 illustrates a process 400 of transmitting data in a network by a device, such as serving device 302.

In a process block 405, packet generation component 316 generates a first data packet 332 to include first timing information 330. In one aspect, the timing information 330 included in the first data packet 332 is generated by, and received from timing generator 314. Thus, the first timing information 330 is based on a time at which the first data packet 332 is generated. In one embodiment, the first timing information 330 may include a timestamp generated by timing generator 314. Both the timing generator 314 and the packet generation component 316 reside and operate within the higher application layer 302, as shown in FIG. 3. The first data packet 332 is then provided to the transmitter 322 of communication subsystem 310. In one embodiment, the first data packet 332 is provided to the transmitter 322 by way of a PCIe Bridge (not shown). Process 400 then includes process block 410 of modifying the first data packet to generate a modified data packet 338. The modified data packet 338 is generated to include both the first timing information 330 and second timing information 334 generated by timing generator 320. Process block 415 then includes transmitting the modified data packet 338 to a network (e.g., network 106 of FIG. 1). The second timing information 334 included in the modified data packet 338 is, thus based on a time at which the modified data packet 338 is transmitted to the network. In one embodiment, the second timing information 334 may include a timestamp generated by timing generator 320. In another embodiment, the second timing information 334 includes a time value that is representative of a difference between the time at which the first data packet 332 was generated and a current time at which the modified data packet 338 is transmitted.

As discussed above, timing generator 314 is linked to timing generator 320, such that the first and second timing information included in the modified data packet 338 provides meaningful information to the client device regarding the difference between the time the data packet was generated and the time the data packet was transmitted. As shown in FIG. 3, timing generator 314 is linked to timing generator 320 by way of bus 312 at the physical layer 304. In one embodiment, timing generator 314 may provide linking information 336 through one or more abstraction layers to bus interface 318 to be communicated to bus interface 324 via bus 312. Bus interface 324 then provides the linking information 336 to timing generator 320 for the generation of the second timing information 334. In one embodiment, timing generator 314 includes a counter that is incremented in response to a clock source to generate a timestamp. Thus, linking information 336 may include a current value of the counter that is communicated through bus 312 by way of the data line 328. In another example, linking information 336 may include the current timestamp value, also communicated by way of data line 328. In yet another example, a clock signal generated by the clock source included in the timing generator 314 may be utilized to control the clock line 326 of bus 312 to serve as a reference for timing generator 320. Furthermore, bus 312, as in the case of SLIMbus, may provide its own clock signal for clock line 326, which is then used as a common timing reference to both timing generator 314 and timing generator 320. Also, in addition to, or rather than source subsystem 308 providing linking information 336 to communication subsystem 310, linking information 336 may be provided by communication subsystem 310 and communicated to source subsystem 308 by way of bus 312. That is, in some examples, timing generator 320 may generate linking information 336, such as counter values, timestamps, and/or clock signals, to provide to timing generator 314 of source subsystem 308. Thus, embodiments of the present disclosure include the linking of two or more timing generators of differing subsystems via one or more abstraction layers.

Figure 5:
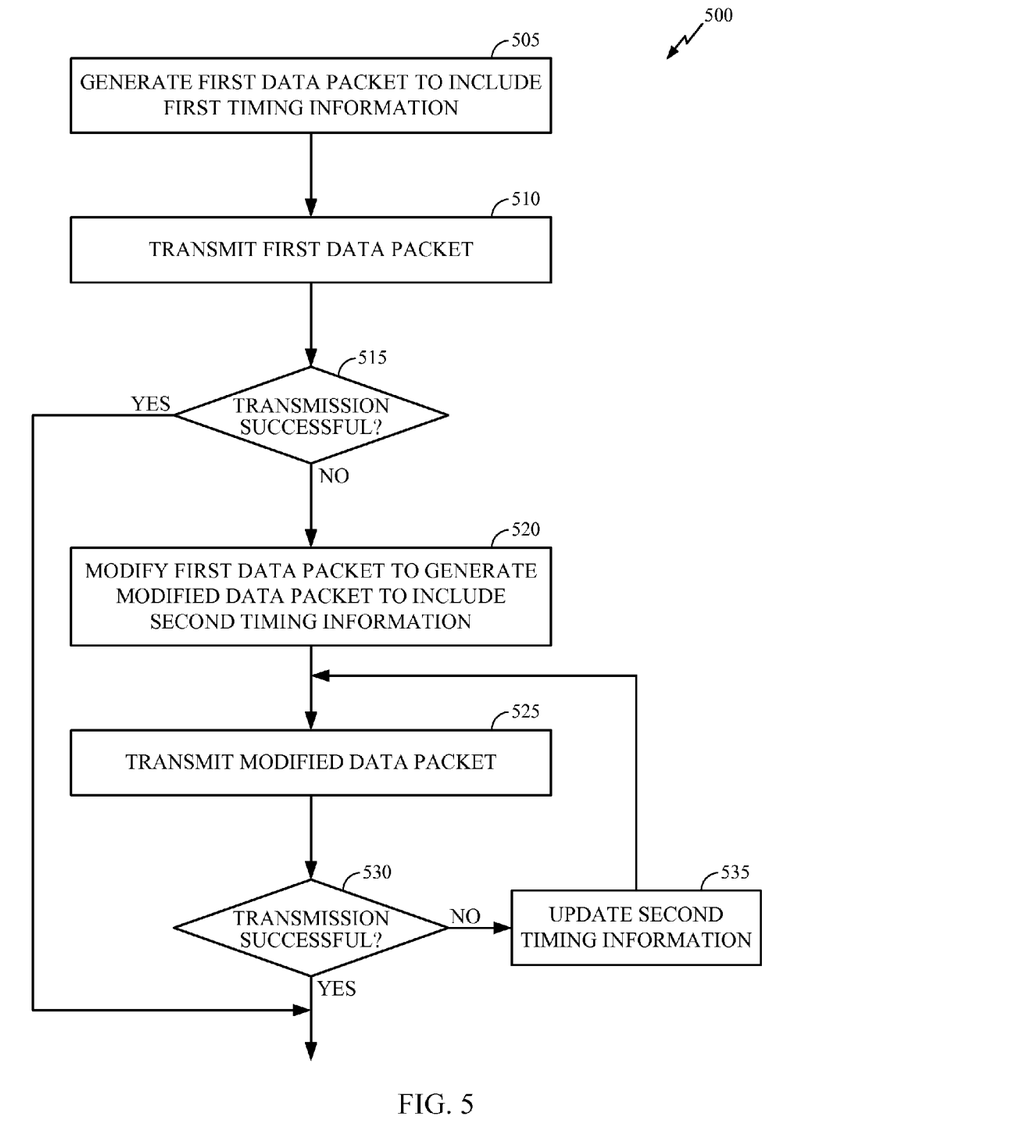
FIG. 5 is a flowchart illustrating a process of transmitting and retransmitting data in a network.

FIG. 5 is a flowchart illustrating a process 500 of transmitting and retransmitting data in a network. Process 500 is described with reference to serving device 302 of FIG. 3. In a process block 505, packet generation component 316 generates a first data packet 332 to include first timing information 330. In one aspect, the timing information 330 included in the first data packet 332 is generated by, and received from timing generator 314. Thus, the first timing information 330 is based on a time at which the first data packet 332 is generated. In one embodiment, the first timing information 330 may include a timestamp generated by timing generator 314. Both the timing generator 314 and the packet generation component 316 reside and operate within the higher application layer 302, as shown in FIG. 3. The first data packet 332 is then provided to the transmitter 322 of communication subsystem 310. Process 500 then includes process block 510 where the first data packet 332 is transmitted to the network (e.g., network 106 of FIG. 1).

Next, in decision block 515, transmitter component 322 determines whether transmission of the first data packet 332 was successful or unsuccessful. Decision block 515 may include determining whether an acknowledgement message was returned for the first data packet. If so, then the transmission was successful and process 500 ends (or proceeds with generating and processing a next packet). If however, in decision block 515 no acknowledgement message was returned for the first data packet and a timeout threshold has been reached, then process 500 determines that the transmission was unsuccessful and process 500 proceeds to process block 520. In process block 520 the first data packet 332 is modified to generate the modified data packet 338. The modified data packet 338 is generated to include both the original first timing information 330 and newly generated second timing information 334 generated by timing generator 320. In one embodiment, transmitter component 322 may also include modifying one or more bits of the modified data packet 338 to indicate that the modified data packet 338 is a retransmission of a previously attempted transmission of the first data packet 332. Thus, these bits included in the modified data packet 338 may be monitored by the client device so as to trigger the client device to look for or otherwise compare the second timing information with the first timing information. Process block 525 then includes transmitting the modified data packet 338 to the network. Accordingly, in some embodiments, the modified data packet 338 is transmitted only in response to determining that the transmission of the first data packet 332 was unsuccessful.

The second timing information 334 included in the modified data packet 338 is based on a time at which the modified data packet 338 is transmitted to the network and is thus different (e.g., later in time) from that of the time represented by the first timing information. In one embodiment, the second timing information 334 may include a timestamp generated by timing generator 320. In another embodiment, the second timing information 334 includes a time value that is representative of a difference between the time at which the first data packet 332 was generated and a current time at which the modified data packet 338 is transmitted.

Next, in decision block 530, transmitter component 322 determines whether transmission of the modified data packet 338 was successful or unsuccessful. Decision block 530 may include determining whether an acknowledgement message was returned for the modified data packet. If so, then the retransmission was successful and process 500 ends (or proceeds with generating and processing a next packet). If however, in decision block 530 no acknowledgement message was returned for the modified data packet and a timeout threshold has been reached, then process 500 determines that the retransmission was unsuccessful and process 500 proceeds to process block 535. In process block 535, the second timing information 334 included in the modified data packet 338 is updated to reflect a new retransmission time.

Process 500 then returns to process block 525 to retransmit the modified data packet 338 to the network. Accordingly, process 500 includes updating the second timing information 334 for each retransmission of the modified data packet 338. In one embodiment, transmitter component 322 may maintain a retry count, where retransmission of a modified data packet is ceased after a threshold number of failed retransmissions is reached.

Figure 6:
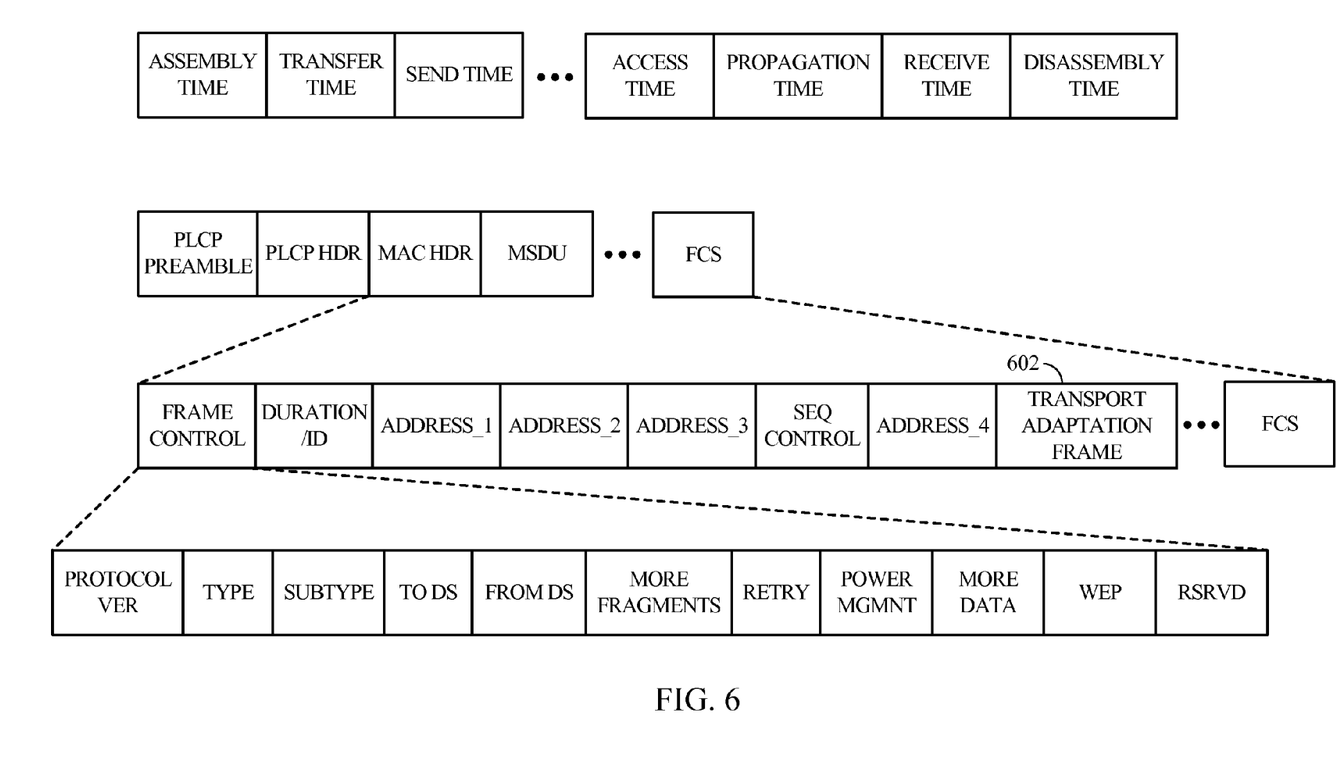
FIG. 6 is a diagram illustrating an example frame format for a first data packet having first timing information.

FIG. 6 is a diagram illustrating an example frame format for a first data packet having first timing information. The frame format of FIG. 6 is one possible implementation of the frame format used for the first data packet 332 of FIG. 3. As shown in FIG. 6, a first timing information, such as a timestamp, is included in a timing-advertisement frame 602 of the first data packet.

Figure 7:
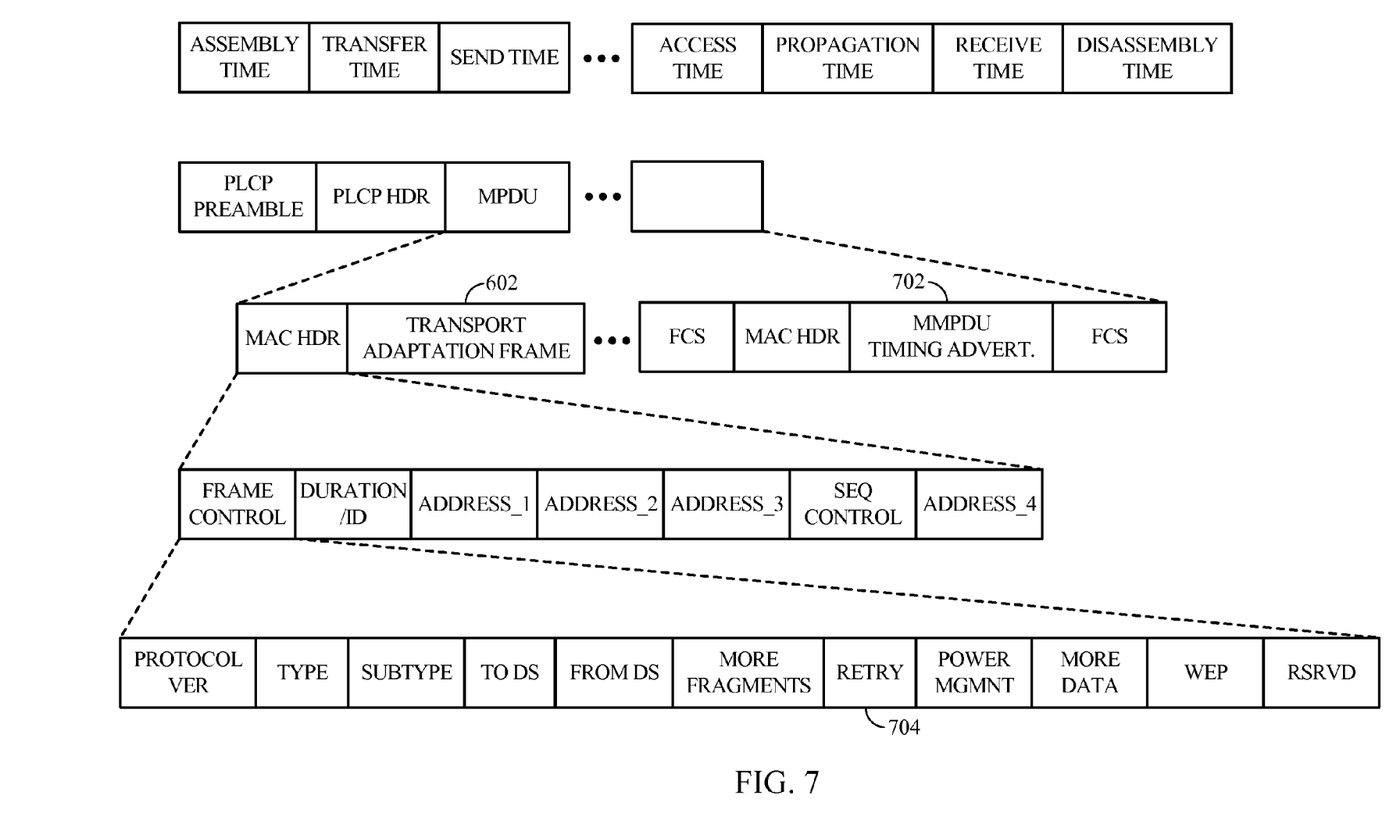
FIG. 7 is a diagram illustrating an example frame format for a modified data packet having both first and second timing information.

FIG. 7 is a diagram illustrating an example frame format for a modified data packet having both first and second timing information. The frame format of FIG. 7 is one possible implementation of the frame format used for the modified data packet 338 of FIG. 3. As shown in FIG. 6, a first timing information, such as a timestamp, is still included in timing-advertisement frame 602 of the modified data packet. In addition, with each adaptation frame resend, a Timing-Advertisement frame 702 with second timing information (e.g., realtime service layer timestamp) is also sent to enable the receiving client device to compensate for timing distortions. The retry timestamp MMPDU is sent as a fragment of the adaptation frame. The modified data packet may also include one or more bits in the retry frame 704 to indicate that the modified data packet 338 is a retransmission of a previously attempted transmission of the first data packet 332.

Figure 8:
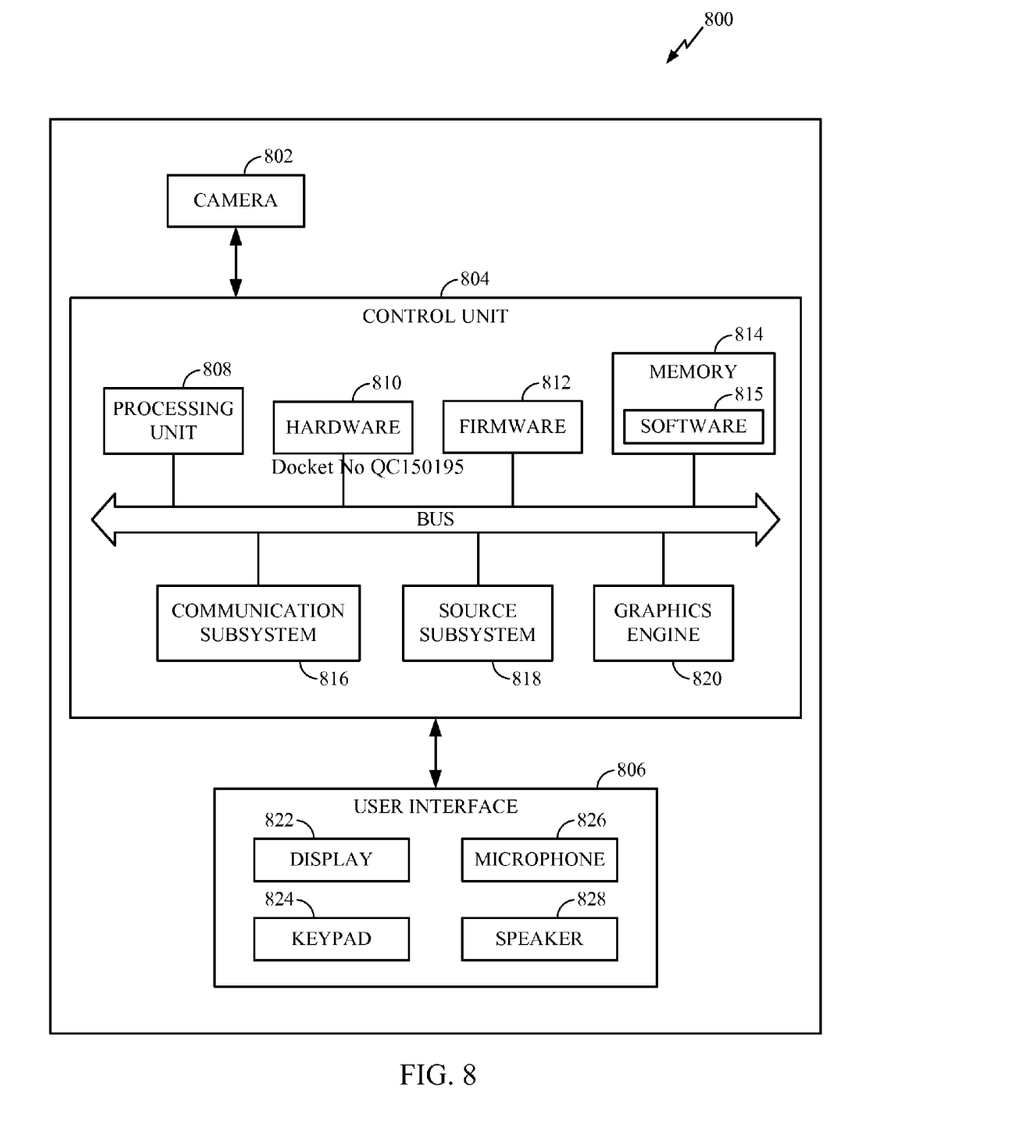
FIG. 8 is a functional block diagram illustrating a device capable of transmitting data in a network.

FIG. 8 is a functional block diagram illustrating a device 800 capable of transmitting data in a network. Device 800 is one possible implementation of serving device 102 of FIG. 1 and/or serving device 302 of FIG. 3. In one example, device 800 is a mobile device. In particular examples, a mobile device may include a cellular telephone, wireless communication device, user equipment, laptop computer, other personal communication system (PCS) device, personal digital assistant (PDA), personal audio device (PAD), portable navigational device, wearable computer, and/or other portable communication devices. A mobile device may also include a processor and/or computing platform adapted to perform functions controlled by machine-readable instructions.

The illustrated example of device 800 includes a camera 802 as well as a user interface 806 that includes the display 822 capable of displaying images captured by the camera 802. User interface 806 may also include a keypad 824 or other input device through which the user can input information into the device 800. If desired, the keypad 824 may be obviated by integrating a virtual keypad into the display 822 with a touch sensor. User interface 806 may also include a microphone 826 and speaker 828, e.g., if the device is a cellular telephone.

Device 800 may include a sensor system (not shown in FIG. 8) that includes sensors such as a proximity detector, accelerometers, magnetometer, gyroscopes, or other similar motion sensing elements.

Device 800 also includes a control unit 804 that is connected to and communicates with the camera 802 and user interface 806, along with other features, such as the communication subsystem 816 and the source subsystem 818. Control unit 804 may be provided by a processor 808 and associated memory 814, hardware 810, software 815, and firmware 812.

Control unit 804 also includes the source subsystem for generating data packets and the communication system 816 for transmitting the data packets as described above with reference to processes 400 and 500, described above. Control unit 804 may further include a graphics engine 820, which may be, e.g., a gaming engine, to render desired data in the display 822, if desired. Processor 808, as well as one or more of the communication subsystem 816, the source subsystem 818, and graphics engine 820 can include one or more microprocessors, embedded processors, controllers, application specific integrated circuits (ASICs), advanced digital signal processors (ADSPs), and the like. The term processor describes the functions implemented by the system rather than specific hardware. Moreover, as used herein the term "memory" refers to any type of computer storage medium, including long term, short term, or other memory associated with device 800, and is not to be limited to any particular type of memory or number of memories, or type of media upon which memory is stored.

The processes described herein may be implemented by various means depending upon the application. For example, these processes may be implemented in hardware 810, firmware 812, software 815, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the processes may be implemented with modules (e.g., procedures, functions, and so on) that perform the functions described herein. Any computer-readable medium tangibly embodying instructions may be used in implementing the processes described herein. For example, program code may be stored in memory 814 and executed by the processor 808. Memory 814 may be implemented within or external to the processor 808.

Figure 9:
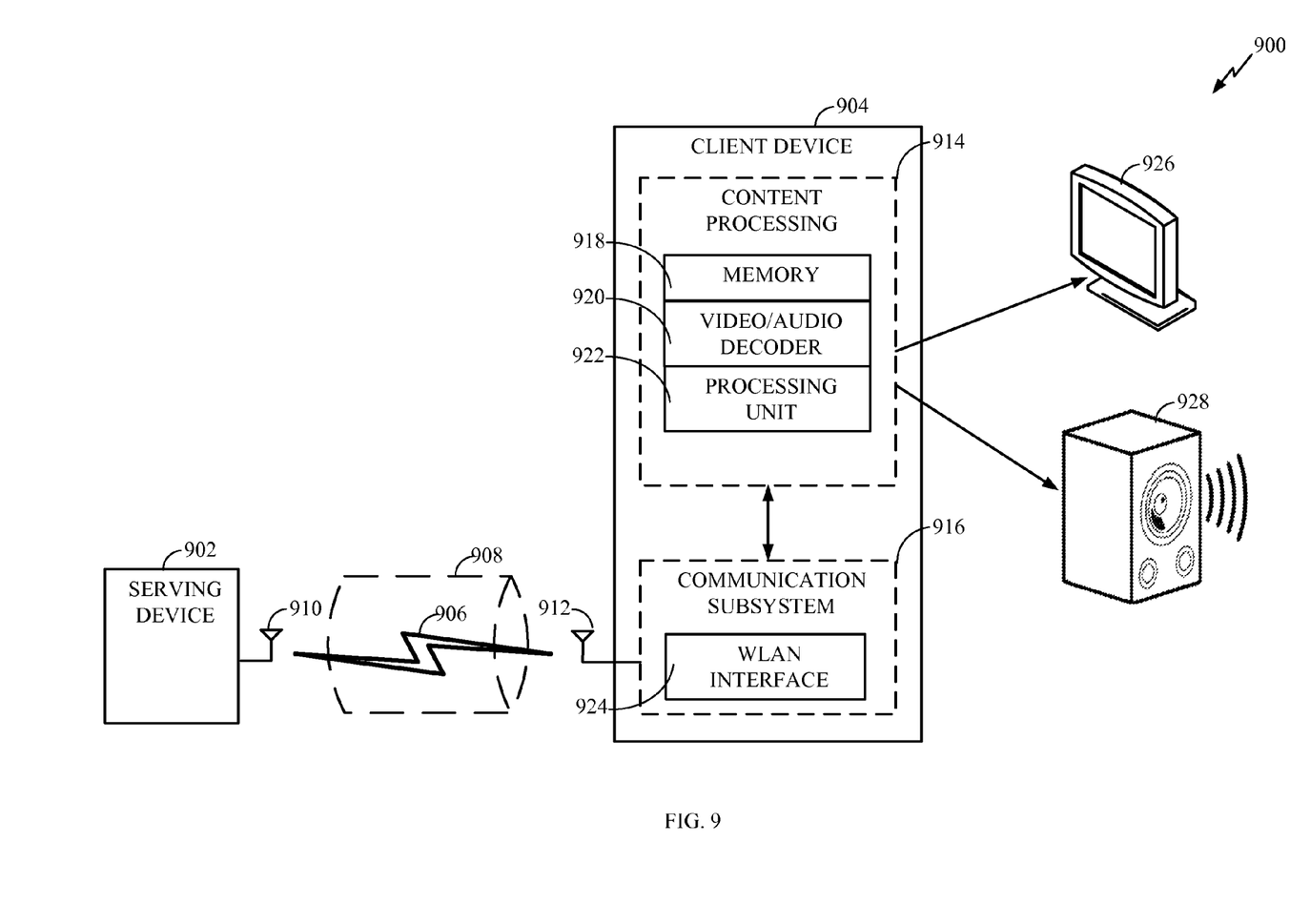
FIG. 9 is a functional block diagram illustrating a device capable of receiving data in a network.

FIG. 9 is a functional block diagram illustrating a device 904 capable of receiving data in a wireless communication system 900. The wireless communication system 900 includes serving device 902 and client device 904. The serving device 902 is a wireless communications-capable device (e.g., serving device 102 of FIG. 1, serving device 302 of FIG. 3, and/or device 800 of FIG. 8) with access to audio and/or video content (e.g., by downloading video streams via a cellular network connection, or by accessing an audio file stored in serving device 902, etc.). In some embodiments and/or scenarios, the serving device 902 provides multimedia content, including not only video content but also audio content and/or graphical content.

The client device 904 is any wireless communications-capable device able to receive multimedia content from the serving device 902, and output/present the received multimedia content. For example, display 926 is either a component with a wired connection to client device 904, or an integral part of the client device 904. In one embodiment, the client device 904 is an audio/video (A/V) receiver and the display 926 is a high-definition (HD) television connected to client device 904 via an HDMI cable. In another example embodiment, the client device 904 is a laptop computer and the display 926 and speakers 928 are integrated with the laptop computer.

Serving device 902 may transmit and receive messages via an antenna 910 over a wireless link 906 with the antenna 912 of client device 904. The exchanged messages may include information related to various types of communication (e.g., voice, data, multimedia services, associated control signaling, connection setup procedures, etc.). The wireless link 906 may operate over a communication medium of interest, shown by way of example in FIG. 9 as the medium 908, which may be shared with other communications. Medium 908 may be composed of one or more frequency, time, and/or space communication resources (e.g., encompassing one or more channels across one or more carriers) associated with communication between one or more transmitter/receiver pairs, such as the serving device 902 and client device 904.

In an embodiment, the serving device 902 provides content (e.g., video and/or audio, etc.) to client device 904 via a wireless local area network (WLAN). In one embodiment where the serving device 902 and client device 904 are Miracast devices, for example, the serving device 904 provides content to client device 904 via a Wi-Fi connection, i.e., the serving device 902 communicates with the client device 904 according to an IEEE 802.11 protocol such as IEEE 802.11a, 802.11b, 802.11n, or 802.11ac, for example. To support these communications, the client device 904 includes a communication subsystem, such as WLAN interface 924 and one or more antennas 912. The WLAN interface 924 may include at least a physical layer (PHY) processing unit and a medium access control (MAC) processing unit (not shown in FIG. 9) that are both configured to operate according to the communication protocol. The WLAN interface 924 may be configured to both transmit and receive data via the WLAN network. In various embodiments, the WLAN interface 924 is implemented in dedicated firmware or hardware (e.g., on an application-specific integrated circuit (ASIC)), and/or in software (e.g., with the WLAN interface 924 including one or more processors configured to execute software instructions stored in memory 918). The memory 918 may include one or more volatile and/or nonvolatile memories, such as a random access memory (RAM) and/or a read-only memory (ROM), for example.

In addition to WLAN interface 924 and memory 918, the client device 904 includes a processing unit 922 and a video/audio decoder 920. In one embodiment, processing unit 922 includes a Wi-Fi Direct application processor that is configured to handle Wi-Fi Direct tasks in accordance with a Wi-Fi Direct specification, such as tasks related to discovery, pairing, and connection, and tasks related to rendering of the video content provided by serving device 902. Processing unit 922 may additionally perform some functions below the application layer (e.g., functions of multiple layers of the Wi-Fi Direct/Miracast stack). In some embodiments, processing unit 922 is implemented in software (e.g., with the processing unit 922 including one or more processors configured to execute software instructions stored in memory 904) and/or in dedicated firmware or hardware (e.g., on an ASIC). In an embodiment, the processing unit 922 is external to (i.e., separate from) at least the WLAN interface 924.

The video/audio decoder 920 is coupled to the processing unit 922, and is configured to decode video/audio data that was encoded by the video encoder of serving device 902 by operating according to the same video compression technique or standard as serving device 902. For example, serving device 902 and client device 904 may both include an H.264 video encoder, where the video/audio decoder 920 is the H.264 video decoder. In various embodiments, the video/audio decoder 920 is implemented in dedicated firmware or hardware, and/or in software (e.g., with the video/audio decoder 920 including one or more processors configured to execute software instructions stored in memory 918). In some embodiments, the processing unit 922 and video/audio decoder 920 are at least in part the same processor or set of processors. In one embodiment, for example, the processing unit 922 and video/audio decoder 920 both execute software instructions using the same set of one or more general-purpose processors.

In operation, in an embodiment, the serving device 902 may discover and pair to the client device 904, where serving device 902 and client device 904 establish a session for streaming video from serving device 902 to client device 904. In one embodiment, serving device 902 and/or client device 904 negotiate or set a video format for the video stream before the serving device 902 sends any content to client device 904.

Once the video format is established, video streaming can begin. The serving device 902 obtains the video data for the video stream from a source that is either internal or external to the serving device 902, and then transmits the video stream to client device 904 via wireless link 906. As discussed above, serving device 902 is configured to append timing information (e.g., a timestamp) that corresponds to a time that a data packet is actually transmitted. Thus, the packets transmitted via wireless link 906 may include first timing information that corresponds to the time that serving device 902 generated the packet, as well as second timing information corresponding to a transmission time. In another aspect, with each retransmission of a respective data packet, serving device 902 updates the second timing information, such that it accurately represents the time of the most recent retransmission. Upon receipt of the data packet containing both the first and second timing information, processing unit 922 of client device 904 may compensate for timing distortions caused by network latency (e.g., due packet loss, and/or retransmission) using both the first and second timing information.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a process for communicating data on a network. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A device for transmitting data in a network, the device comprising:
a source subsystem configured to generate a first data packet that includes first timing information that is based on a time at which the first data packet is generated, wherein the source subsystem comprises a first timing generator configured to generate the first timing information; and
a communication subsystem coupled to the source subsystem via one or more abstraction layers, the communication subsystem configured to modify the first data packet to generate and transmit a modified data packet to the network, wherein the communication subsystem is configured to generate the modified data packet to include the first timing information and second timing information that is based on a time at which the modified data packed is transmitted to the network, and wherein the communication subsystem comprises a second timing generator that is linked to the first timing generator through the one or more abstraction layers to generate the second timing information.

2. The device of claim 1, wherein the first timing information includes a first timestamp that is representative of the time at which the first data packet is generated, and wherein the second timing information includes a second timestamp that is representative of the time at which the modified data packet is transmitted to the network.

3. The device of claim 1, wherein the first timing information includes a first timestamp that is representative of the time at which the first data packet was generated, and wherein the second timing information includes a time value that is representative of a difference between the time at which the first data packet was generated and a time at which the modified data packet is transmitted.

4. The device of claim 1, wherein the communication subsystem is further configured to:
transmit the first data packet on the network; and
determine whether the transmission of the first data packet was successful or unsuccessful, wherein the communication subsystem transmits the modified data packet only in response to determining that the transmission of the first data packet was unsuccessful.

5. The device of claim 4, wherein the communication subsystem is further configured to update the second timing information contained in the modified data packet in response to the second timing generator for each retransmission of the modified data packet.

6. The device of claim 4, wherein the communication subsystem is further configured to generate the modified data packet to include one or more bits that indicate that the modified data packet is a retransmission of a previously attempted transmission of the first data packet.

7. The device of claim 1, further comprising a synchronous interface coupled to both the source subsystem and the communication subsystem at a physical layer of the one or more abstraction layers for synchronizing the second timing generator with the first timing generator.

8. The device of claim 7, wherein the synchronous interface comprises an inter-chip bus connecting the source subsystem with the communication subsystem.

9. The device of claim 8, wherein the inter-chip bus consists of a data line and a clock line.

10. The device of claim 1, wherein the first timing information comprises synchronization data for multimedia communications on the network.

11. The device of claim 1, wherein the network is a Wi-Fi Direct connection and wherein the communication subsystem is further configured to transmit the modified data packet to a client device via the Wi-Fi Direct connection.

12. A method for transmitting data in a network, the method comprising:
generating a first data packet at a first abstraction layer, the first data packet including first timing information that is based on a time at which the first data packet is generated in response to a first timing generator;
modifying the first data packet to generate a modified data packet at a second abstraction layer, wherein the modified data packet includes the first timing information and second timing information that is based on a time at which the modified data packet is transmitted to the network, wherein the second timing information is generated in response to a second timing generator at the second abstraction layer, and wherein the second timing generator at the second abstraction layer is linked to the first timing generator at the first abstraction layer; and
transmitting the modified data packet to the network.

13. The method of claim 12, wherein the first timing information includes a first timestamp that is representative of the time at which the first data packet is generated, and wherein the second timing information includes a second timestamp that is representative of the time at which the modified data packet is transmitted to the network.

14. The method of claim 12, wherein the first timing information includes a first timestamp that is representative of the time at which the first data packet was generated, and wherein the second timing information includes a time value that is representative of a difference between the time at which the first data packet was generated and a time at which the modified data packet is transmitted.

15. The method of claim 12, further comprising:
transmitting the first data packet on the network; and
determining whether transmission of the first data packet was successful or unsuccessful, wherein transmitting the modified data packet to the network comprises transmitting the modified data packet only in response to determining that the transmission of the first data packet was unsuccessful.

16. The method of claim 15, further comprising updating the second timing information contained in the modified data packet in response to the second timing generator for each retransmission of the modified data packet.

17. The method of claim 15, further comprising generating the modified data packet to include one or more bits of the modified data packet that indicate that the modified data packet is a retransmission of a previously attempted transmission of the first data packet.

18. The method of claim 12, further comprising synchronizing the second timing generator with the first timing generator via a synchronous interface at a physical layer.

19. The method of claim 18, wherein the synchronous interface comprises an inter-chip bus that consists of a data line and a clock line.

20. The method of claim 12, wherein the first timing information comprises synchronization data for multimedia communications on the network.

21. The method of claim 12, wherein the network is a Wi-Fi Direct connection and wherein transmitting the modified data packet to the network comprises transmitting the modified data packet to a client device via the Wi-Fi Direct connection.

22. A device for transmitting data in a network, the device comprising:
- means for generating a first data packet at a first abstraction layer, the first data packet including first timing information that is based on a time at which the first data packet is generated in response to a first timing generator;
- means for modifying the first data packet to generate a modified data packet at a second abstraction layer, wherein the modified data packet includes the first timing information and second timing information that is based on a time at which the modified data packet is transmitted to the network, wherein the second timing information is generated in response to a second timing generator at the second abstraction layer, and wherein the second timing generator at the second abstraction layer is linked to the first timing generator at the first abstraction layer; and
- means for transmitting the modified data packet to the network.

23. The device of claim 22, further comprising:
means for transmitting the first data packet on the network; and
means for determining whether transmission of the first data packet was successful or unsuccessful, wherein the means for transmitting the modified data packet to the network comprises means for transmitting the modified data packet only in response to determining that the transmission of the first data packet was unsuccessful.

24. The device of claim 22, further comprising means for synchronizing the second timing generator with the first timing generator via a synchronous interface at a physical layer.

25. The device of claim 22, wherein the first timing information includes a first timestamp that is representative of the time at which the first data packet is generated, and wherein the second timing information includes a second timestamp that is representative of the time at which the modified data packet is transmitted to the network.

26. A non-transitory computer-readable medium embedded with at least one or more instructions, which when executed by a processor, perform operations, the operations comprising:
- generating a first data packet at a first abstraction layer, the first data packet including first timing information that is based on a time at which the first data packet is generated in response to a first timing generator;
- modifying the first data packet to generate a modified data packet at a second abstraction layer, wherein the modified data packet includes the first timing information and second timing information that is based on a time at which the modified data packet is transmitted to the network, wherein the second timing information is generated in response to a second timing generator at the second abstraction layer, and wherein the second timing generator at the second abstraction layer is linked to the first timing generator at the first abstraction layer; and
- transmitting the modified data packet to the network.

27. The non-transitory computer-readable medium of claim 26, wherein the operations further comprise:
transmitting the first data packet on the network; and
determining whether transmission of the first data packet was successful or unsuccessful, wherein the modified data packet is transmitted only in response to determining that the transmission of the first data packet was unsuccessful.

28. The non-transitory computer-readable medium of claim 26, wherein the operations further comprise:
synchronizing the second timing generator with the first timing generator via a synchronous interface at a physical layer.

29. The non-transitory computer-readable medium of claim 26, wherein the first timing information includes a first timestamp that is representative of the time at which the first data packet is generated, and wherein the second timing information includes a second timestamp that is representative of the time at which the modified data packet is transmitted to the network.

30. The non-transitory computer-readable medium of claim 26, wherein the first timing information includes a first timestamp that is representative of the time at which the first data packet was generated, and wherein the second timing information includes a time value that is representative of a difference between the time at which the first data packet was generated and a time at which the modified data packet is transmitted.

* * * * *